United States Patent Office 3,074,435
Patented Jan. 22, 1963

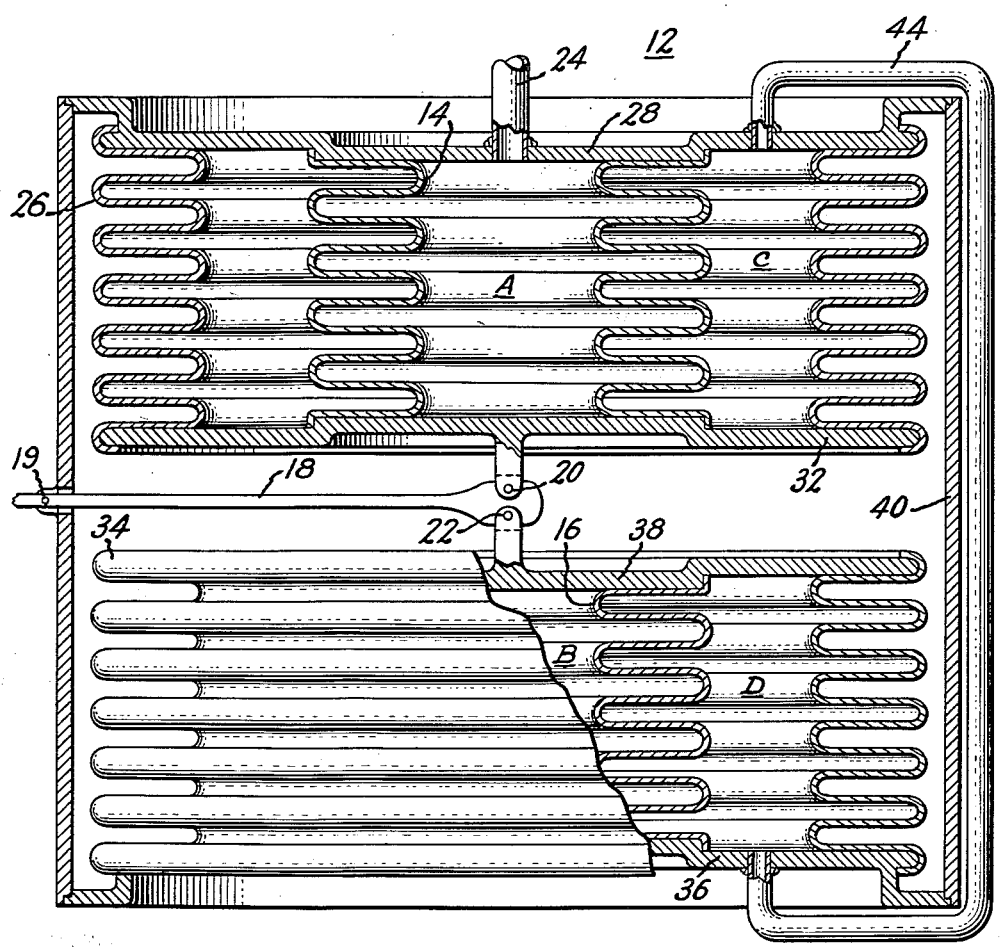

3,074,435
FAIL-SAFE PRESSURE SENSING DEVICE
Francis B. Woestemeyer, Bryn Mawr, Pa., assignor to General Electric Company, a corporation of New York
Filed Sept. 28, 1959, Ser. No. 842,878
2 Claims. (Cl. 137—786)

This invention relates to pressure sensing systems utilizing bellows and more particularly to pressure sensing systems in which the bellows of the system are connected in such as manner as to provide a fail-safe pressure sensing device.

As is well known to those skilled in this art, aircraft automatic pilot systems, inertial guidance systems, missile control devices and other known systems employing various types of pressure sensing devices which are responsive to variable fluid pressures, in many instances utilize bellows as the pressure responsive device. In utilizing bellows in such pressure systems it is extremely important to provide a highly reliable system with a long-life use before failure. However, as will be understood, bellows (as are other devices used in this field) are subject to failure, and, in such instances it is extremely important that such bellows, when utilized in a pressure sensing system, for example for an automatic pilot device, be equipped with a fail-safe feature. Of course, as is well known, the fail-safe feature means that if the device being utilized should fail, it is desired that it fail in such a manner as not to adversely affect the operation of the system. For example, where a device should fail, it is desired that it automatically (in the auto pilot field) switch the auto pilot to manual control with warning to the pilot so that the pilot may readily and directly take over the manual operation of the craft. Naturally, this requires that when the device fails, it fail in such a manner so as not to impede the manual operation of the craft by the human pilot.

It is well known to those skilled in the pressure sensing art that when a bellows fails, normally it fails due to a leakage in the bellows of the system rather than a failure of the resiliency of the bellows. That is, in a normal bellows failure a hole, or some other type of rupture, appears in the fabric of the bellows, allowing fluid to leak in or out, thus upsetting the balance and operation of the bellows. As is well understood by those skilled in the art, the failure of a bellows in a pressure sensing system will normally be effective to make the system entirely inoperative. Alternatively, the failure of the bellows will lead to the system developing extraneous information or providing extraneous movement which, for example in the automatic pilot field, could lead to an unstable condition of the aircraft or to an unsafe maneuver of the aircraft. In many instances where the bellows fails there is generally no indication that the device is operating incorrectly. Another major problem is that the malfunction of the bellows is not necessarily predictable in the sense that it can be recognized and the system or the pilot initiate a change to a safe mode of control. A further problem which is well known in the field is that there are no simple tests which can, in general, be applied to check the integrity of the bellows in a control device while the bellows is still maintained in the pressure sensing system.

It is, therefore, one object of this invention to provide a new and novel pressure sensing system utilizing bellows, wherein the reliability of the system is significantly increased.

Another object of this invention is to provide a fail-safe pressure sensing device such that if one of the primary bellows of the system should fail, there will be no change in the operating characteristics of the system.

A still further object of this invention is to provide a fail-safe sensing device such that if both primary bellows of the device should fail, then the pressure sensing device will automatically move to zero indication to provide a warning of the failure and indicate a change to a safe mode of control.

Another object of this invention is to provide a pressure sensing system utilizing a fail-safe pressure sensing device comprising bellows, in which the integrity of the bellows may be readily tested without removing them from the system.

In carrying out this invention in one form a pair of primary bellows are utilized, at least one of the primary bellows being operated by a source of fluid pressure. An indicating device is mounted so as to be actuated by the pressure differential of the two primary sensing bellows such that a difference in pressure between the primary bellows will provide a desired indication. A pair of secondary bellows is provided, each secondary bellows surrounding and enclosing one of the primary bellows. A pressure equalizing device is utilized between the outer, or secondary bellows, so as to provide equal pressure within such secondary bellows. In this manner, should either of the primary bellows fail it will automatically provide the same pressure in the outer two bellows, thereby maintaining the integrity of the pressure sensing system. On the other hand, should both primary bellows fail, then the pressure differential will be completely eliminated and the indicating device being operated by the primary bellows will move to a zero indication, providing the desired warning of the failure of the inner, or primary, bellows.

The novel features which are characteristic of this invention are set forth in the appended claims. This invention, however, both as to its organization and method of operation, together with further objects and advantages thereof, may best be understood by reference to the following description taken in connection with the accompanying drawing wherein the single FIGURE is an enlarged front elevation view, partially in section showing one form of this invention.

Referring now to the drawing wherein like numerals are used to indicate like parts throughout, this invention in one form is shown as a fail-safe pressure sensing device 12, comprising a pair of primary pressure responsive bellows 14 and 16, each being pivotly connected to a movable take-off arm 18, by means of pivot pins 20 and 22, respectively. The arm 18 may be connected, in any desired manner, to a pressure indicating device (not shown) of any type, as is well known to those skilled in this art. As will be well understood by those skilled in this art, the bellows 14 and 16 are arranged in opposition to each other and are provided with different fluid pressures therein. For example, the bellows 14 may be provided with the fluid pressure of the air in which the fail-safe pressure sensor device of this invention is to be operated by means of the tube 24, which may be, for example, a static pressure tube. The other primary bellows 16 may be operated at a vacuum, that is the bellows 16 is evacuated so as to have vacuum pressure therein. Of course, it will be understood that bellows 16 could also be sealed with a given pressure, for example sea level pressure, such that at any rise in altitude the difference between sea level pressure and the pressure at the altitude which, of course, would be in the bellows 14, would provide a differential pressure between bellows 14 and 16 to thereby operate an indicating device (not shown) by arm 18 to provide a desired indication of the height or altitude at which the device was being used.

Of course, it will be understood that, if desired, each of bellows 14 and 16 could be connected to a separate source of fluid pressure. In such pressure sensing system the indicating device (not shown) would provide an indication of the pressure differential between such separate sources. It will be understood that the bellows respond to various pressures therein by expanding or contracting according to the amount of pressure and the resiliency of the bellows.

In order to make the device of this invention a fail-safe pressure sensing device, the primary bellows 14 is surrounded and enclosed by a secondary bellows 26, both bellows 14 and 26 being connected to a rigid support, or closure device, such as plate 28. Of course, it is understood that the bellows 14 and 26 can be of any desired manufacture, for example they could be both what is known in the art as metallic bellows, and therefore the bellows could be mounted on plate 28 by any desired means, such as, for example, by soldering. Both bellows 14 and 26 are also mounted on a second plate 32 which forms the base of the bellows 14 and 26. They may be attached to the plate 32 in the same manner as attached to plate 28.

In a similar manner, the other primary bellows 16 is also surrounded and enclosed by an outer secondary bellows 34, both bellows 16 and 34 being attached to a rigid support or closure 36, and a second plate 38, in the same manner as bellows 14 and 26. The entire device may be enclosed in a casing, such as for example a casing 40 as shown in the drawing. Bellows 26 and 34, which surround and enclose the primary bellows 14 and 16, are provided with a pressure equalizing device by any desired means, so that the pressure in both bellows 26 and 34 will be the same. As shown, for example, the bellows 26 and 34 may be connected by means of a tube 44 so as to allow the fluid pressure of either bellows 26 and 34 to freely circulate into the other bellows. In this manner, the fluid pressure in each of the outer secondary bellows 26 and 34 will be maintained at the same pressure at all times. Since the pressure in the outer bellows 26 and 34 is always the same, the variable pressure or pressure differential between 14 and 16 will not be affected by the pressure in the secondary bellows. Therefore, the device will operate in the same manner as the primary bellows 14 and 16 would operate without the secondary bellows. Thus, the differential pressure between bellows 14 and 16 will be effective to operate the indicating arm 18 which pivots outside of casing 40 on pivot pin 19 and provides a desired indication on a meter or other device (not shown), in a manner well known to those skilled in this art.

From the above, it will be obvious that should either bellows 14 or 16 develop a leak, the pressure within the ruptured bellows will be the same as the pressure in the secondary bellows. For example, should bellows 16 develop a leak, then bellows 16 will leak into bellows 34 which in turn will have its pressure equalized to bellows 26 by means of the fluid pipe 44, which equalizes the pressure between the two bellows 26 and 34. In such instance, the pressure in bellows 16, 34 and 26 would all be the same, and, therefore, a difference of pressure would still be obtained between bellows 14 and bellows 16 to provide the same indication of a pressure difference as was true in the first case. Where the device of this invention is utilized as above described, that is, where the bellows 16 is either sealed at sea level pressure or is evacuated, then in order to prevent a leakage in bellows 16 from providing any degradation of the system, the bellows 26 and 34 are similarly evacuated, or sealed, at the same pressure. Therefore, a leakage in the bellows 16 would not change the pressure gradient within bellows 16 and the pressure differential between bellows 14, and bellows 16 will remain the same. On the other hand, should the leakage occur in bellows 14, then by means of the fluid pressure pipe 44, the pressure within bellows 14, bellows 26 and bellows 34 would be equalized, and, therefore the pressure differential between bellows 14 and bellows 16 would similarly be maintained. Since if bellows 14 is maintained at the pressure at a given altitude by means of pipe 24, then, of course, the pressure in bellows 26 and bellows 34 would all be maintained at this pressure. Therefore, the pressure differential between 14 and 16 will again remain the same.

In the embodiment of this invention, as shown in the drawing, the various bellows are labeled with letters to indicate the area of the different bellows. As shown in the preferred embodiment, the area A and B of the inner bellows 14 and 16, respectively, are designed to be equal. Likewise, the two bellows act at points on the indicating arm 18 which are equidistant from the pivot 19 to provide the desired operation. With the area of bellows 14 and 16 being equal, then the areas C and D of secondary bellows 26 and 34 are similarly made to be equal, such that when pressure is applied the resultant forces between the bellows 26 and 34 will be balanced inasmuch as both bellows will be maintained at the same pressure.

Of course, it will be understood that in those instances where desired, the areas A and B of bellows 14 and 16, respectively, may be made unequal. For example, area A of bellows 14 may be made smaller than area B of bellows 16. In such instances, the area C of bellows 26 would necessarily be smaller than the area D of bellows 34, such that the area C—A would equal area D—B. In the same manner, if the bellows 14 were mounted to act at a point a greater distance from pivot 19 than bellows 16, then the differential area D—B, of the bellows 16 and 34, would necessarily be larger than the differential area C—A of the bellows 14 and 26, in an inverse proportion to the distances of the pins 20 and 22 from pin 19. Thus, it will be understood that the device of this invention may be utilized in any known pressure sensing system to provide a fail-safe pressure sensing device.

The fail-safe pressure sensor of this invention also readily lends itself to a simple test for leaks while still in the pressure sensing system. In order to test the device for leaks a positive pressure is applied to the outer or secondary bellows 26 and 34. This positive pressure may be applied by means of tube 44. If a change in the position of arm 18 is noted, that is a change in reading of the differential pressure indicating device (not shown), then the inner sealed bellows, for example bellows 16, has a leak. Should it be impossible to seal the outer bellows 26 and 34 at a desired pressure, or a vacuum, then it will be known that either the primary bellows open to the air, or one of the secondary bellows has a leak. Thus, the application of a positive pressure to the secondary bellows and then sealing of these bellows provides a positive test to check the integrity of the bellows in the pressure sensing system.

While there has been shown and described a preferred embodiment of this invention, it will be understood that changes and modification may be made, if desired. It will be obvious to those skilled in the art that such changes or modifications may be made without departing from the spirit and scope of this invention as defined in the appended claims.

What is claimed as new and which is desired to secure by Letters Patent of the United States is:

1. A fail-safe pressure sensing device comprising:
   (a) an outer casing having parallel opposed end plates,
   (b) an inwardly extending primary bellows secured to each end plate,
   (c) an inwardly extending secondary bellows secured to each end plate and arranged to surround the associated inwardly extending primary bellows,
   (d) a pair of parallel opposed inner plates within said outer casing and spaced therefrom,
   (e) each inner plate secured to the common inwardly extending ends of the primary bellows and the associated secondary bellows to seal said primary bellows within said secondary bellows,
   (f) actuating means pivotally mounted and connected to said inner plates for movement in response to expansion and contraction of said primary bellows, (g) means connecting at least one of said primary bellows to a source of fluid pressure, (h) and means separate from said outer casing for interconnecting said secondary bellows to equalize the internal pressure of said bellows wherby the leakage from either of said primary bellows will be into an associated one of said secondary bellows which is transmitted as internal pressure to the other secondary bellows.

2. A fail-safe pressure sensing device comprising:

(a) an outer casing having parallel opposed end plates, (b) an inwardly extending primary bellows secured to each end plate, (c) an inwardly extending secondary bellows secured to each end plate and arranged to surround the associated inwardly extending primary bellows, (d) a pair of parallel opposed inner plates within said outer casing and spaced therefrom, (e) each inner plate secured to the common inwardly extending ends of the primary bellows and the associated secondary bellows to seal said primary bellows within said secondary bellows, (f) actuating means pivotally mounted and connected to said inner plates for movement in response to expansion and contraction of said primary bellows, (g) means connecting at least one of said primary bellows to a source of fluid pressure, (h) the other of said primary bellows adapted to be sealed at a desired pressure, (i) and means separate from said outer casing for interconnecting said secondary bellows to equalize the internal pressure of said bellows whereby the leakage from either of said primary bellows will be into an associated one of said secondary bellows which is transmitted as internal pressure to the other secondary bellows.

References Cited in the file of this patent
UNITED STATES PATENTS

| | | |
|---|---|---|
| 2,335,943 | Jones | Dec. 7, 1943 |
| 2,747,614 | Gray | May 29, 1956 |